United States Patent
Lawrence et al.

(10) Patent No.: US 12,212,241 B2
(45) Date of Patent: Jan. 28, 2025

(54) PHASE INTERLEAVING IN A MULTIPHASE POWER CONVERTER

(71) Applicant: Cirrus Logic International Semiconductor Ltd., Edinburgh (GB)

(72) Inventors: Jason W. Lawrence, Austin, TX (US); Graeme G. Mackay, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 254 days.

(21) Appl. No.: 18/061,591

(22) Filed: Dec. 5, 2022

(65) Prior Publication Data
US 2023/0188044 A1 Jun. 15, 2023

Related U.S. Application Data

(60) Provisional application No. 63/289,885, filed on Dec. 15, 2021.

(51) Int. Cl.
*H02M 3/158* (2006.01)
*H02M 1/15* (2006.01)
*H02M 3/156* (2006.01)

(52) U.S. Cl.
CPC ............ *H02M 3/1586* (2021.05); *H02M 1/15* (2013.01); *H02M 3/1563* (2013.01)

(58) Field of Classification Search
CPC ...... H02M 1/15; H02M 3/1563; H02M 3/157; H02M 3/1584–1586
See application file for complete search history.

(56) References Cited

U.S. PATENT DOCUMENTS

| | | | |
|---|---|---|---|
| 8,525,500 B1* | 9/2013 | Martin | H02M 3/156 323/283 |
| 9,653,995 B2 | 5/2017 | Siehl et al. | |
| 2012/0218792 A1* | 8/2012 | Ziegler | H02M 3/1584 363/84 |
| 2015/0067358 A1* | 3/2015 | Philbrick | H02M 3/158 713/300 |
| 2021/0367510 A1 | 11/2021 | Lawrence et al. | |

OTHER PUBLICATIONS

International Search Report and Written Opinion of the International Searching Authority, International Application No. PCT/US2022/052009, mailed Mar. 21, 2023.

* cited by examiner

*Primary Examiner* — Fred E Finch, III
(74) *Attorney, Agent, or Firm* — Jackson Walker L.L.P.

(57) ABSTRACT

A system for generating a plurality of switch control signals of a multiphase power converter may include a plurality of inputs, each input of the plurality of inputs configured to receive a respective control signal for controlling a respective phase of the multiphase power converter, and a plurality of control paths comprising a control path for each respective control signal, each control path configured to, for its respective control signal, control a switching period of the respective control signal for such control path based on a measure of alignment among the respective control signal for such control path and the other respective control signals of the other control paths.

14 Claims, 9 Drawing Sheets

PHASE INTERLEAVING IN A MULTIPHASE POWER CONVERTER

RELATED APPLICATION

The present disclosure claims priority to U.S. Provisional Patent Application Ser. No. 63/289,885 filed Dec. 15, 2021, which is incorporated by reference herein in its entirety.

FIELD OF DISCLOSURE

The present disclosure relates in general to circuits for electronic devices, including without limitation personal audio devices such as wireless telephones and media players, and more specifically, to enable phase interleaving in a multiphase power converter in a manner that reduces or eliminates phase alignment among the multiple phases of the power converter.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

A power converter may be used to provide supply voltage rails to one or more components in a device. Accordingly, it may be desirable to regulate an output voltage of a power converter with minimal ripple in the presence of a time-varying current and power load. One approach to regulating a DC voltage in an inductive-based power converter output is that of peak/valley current control. Using peak/valley current control, control circuitry may employ a feedback control loop that may, as a function of a desired regulated output voltage of the power converter, determine a target minimum or "valley" current and a target maximum or "peak" current through an inductor of the power converter, and control switches of the power converter based on comparison of a sensed current through the inductor in order to regulate the sensed current between the valley current and the peak current.

Another approach to minimize ripple is the use of a multiphase power converter, which in essence utilizes a plurality of parallel individual power converters, each known as a "phase," and interleaves the active or "on" times of each phase during each switching cycle of the power converter. To maintain minimal ripple, it may be necessary to prevent the active states of the various phases from coming into close alignment with one another, and minimal ripple may occur when the phases are maximally misaligned. However, existing approaches to maximizing phase misalignment in multiphase peak/valley controlled power converters have disadvantages. For example, in one approach to maintaining phase misalignment, which may be referred to as "time phasing," a primary phase of the power converter may be peak/valley current controlled while other "secondary" phases of the power converter are peak current controlled and valley time controlled by set delays from the time at which the primary phase reaches its valley current. However, such approach can experience subharmonic oscillation for duty cycles over 50% and may suffer from disturbance when the primary phase has a large variation during its transient response due to the difficulty when estimating the valley times for the various secondary phases.

Another approach to maintaining phase misalignment may be referred to as "randomized interleaving" and may involve randomization of valley currents (e.g., by one least-significant bit from a setpoint valley current) to misalign phases as a result of the randomly varying valley current causing a constantly changing switching period. However, under such approach it remains possible for one or more phases to briefly align for one or more switching periods.

Accordingly, improved techniques for maximizing phase alignment to minimize ripple current in a multiphase power converter are desired.

SUMMARY

In accordance with the teachings of the present disclosure, one or more disadvantages and problems associated with existing approaches to regulating an output voltage of a power converter while minimizing current ripple may be reduced or eliminated.

In accordance with embodiments of the present disclosure, a system for generating a plurality of switch control signals of a multiphase power converter may include a plurality of inputs, each input of the plurality of inputs configured to receive a respective control signal for controlling a respective phase of the multiphase power converter, and a plurality of control paths comprising a control path for each respective control signal, each control path configured to, for its respective control signal, control a switching period of the respective control signal for such control path based on a measure of alignment among the respective control signal for such control path and the other respective control signals of the other control paths.

In accordance with these and other embodiments of the present disclosure, a method for generating a plurality of switch control signals of a multiphase power converter may include receiving at each of a plurality of inputs a respective control signal for controlling a respective phase of the multiphase power converter and for a plurality of control paths comprising a control path for each respective control signal, controlling by each control path, for its respective control signal, a switching period of the respective control signal for such control path based on a measure of alignment among the respective control signal for such control path and the other respective control signals of the other control paths.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
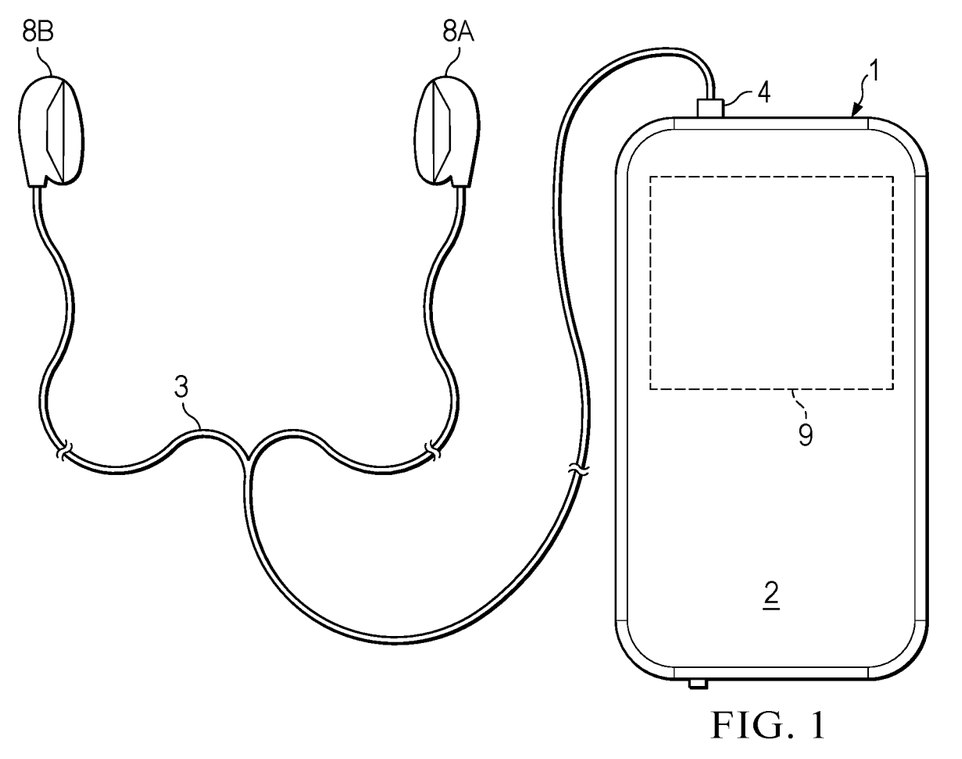
FIG. 1 illustrates an example mobile device, in accordance with embodiments of the present disclosure.

FIG. 1 illustrates an example mobile device 1, in accordance with embodiments of the present disclosure. FIG. 1 depicts mobile device 1 coupled to a headset 3 in the form of a pair of earbud speakers 8A and 8B. Headset 3 depicted in FIG. 1 is merely an example, and it is understood that mobile device 1 may be used in connection with a variety of audio transducers, including without limitation, headphones, earbuds, in-ear earphones, and external speakers. A plug 4 may provide for connection of headset 3 to an electrical terminal of mobile device 1. Mobile device 1 may provide a display to a user and receive user input using a touch screen 2, or alternatively, a standard liquid crystal display (LCD) may be combined with various buttons, sliders, and/or dials disposed on the face and/or sides of mobile device 1.

Figure 2:
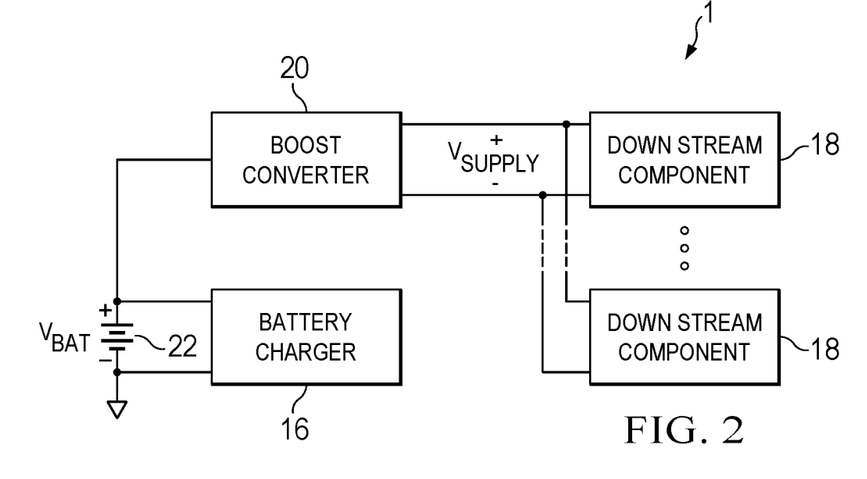
FIG. 2 illustrates a block diagram of selected components internal to a mobile device, in accordance with embodiments of the present disclosure.

FIG. 2 illustrates a block diagram of selected components integral to mobile device 1, in accordance with embodiments of the present disclosure. As shown in FIG. 2, mobile device 1 may include a boost converter 20 configured to boost a battery voltage $V_{BAT}$ to generate a supply voltage $V_{SUPPLY}$ to a plurality of downstream components 18 of mobile device 1. Downstream components 18 of mobile device 1 may include any suitable functional circuits or devices of mobile device 1, including without limitation processors, audio coder/decoders, amplifiers, display devices, etc. As shown in FIG. 2, mobile device 1 may also include a battery charger 16 for recharging battery 22.

In some embodiments of mobile device 1, boost converter 20 and battery charger 16 may comprise the only components of mobile device 1 electrically coupled to battery 22, and boost converter 20 may electrically interface between battery 22 and all downstream components 18 of mobile device 1. However, in other embodiments of mobile device 1, some downstream components 18 may electrically couple directly to battery 22.

Figure 3:
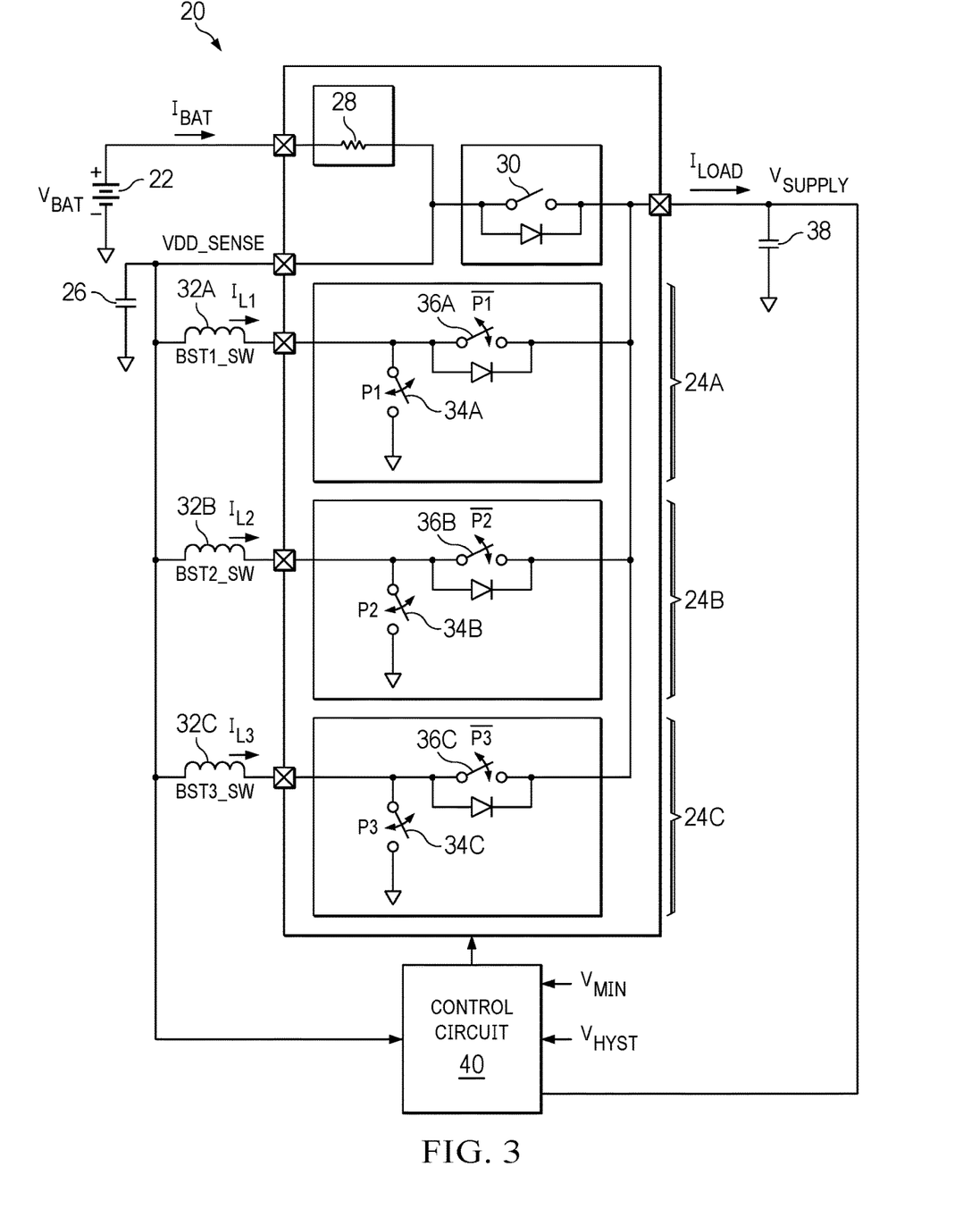
FIG. 3 illustrates a block diagram of selected components of an example boost converter with multiple modes of operation depicting operation in a boost active mode, in accordance with embodiments of the present disclosure.

FIG. 3 illustrates a block diagram of selected components of example boost converter 20 depicting operation in a boost active mode, in accordance with embodiments of the present disclosure. As shown in FIG. 3, boost converter 20 may include a battery 22, a plurality of inductive boost phases 24 (e.g., inductive boost phases 24A, 24B, and 24C), a sense capacitor 26, a sense resistor 28, a bypass switch 30, and a control circuit 40. As shown in FIG. 3, each inductive boost phase 24 may include a power inductor 32 (e.g., power inductors 32A, 32B, and 32C), a charge switch 34 (e.g., charge switches 34A, 34B, and 34C), a rectification switch 36 (e.g. rectification switches 36A, 36B, and 36C), and output capacitor 38.

Although FIG. 3 depicts boost converter 20 having three inductive boost phases 24, embodiments of boost converter 20 may have any suitable number of inductive boost phases 24. In some embodiments, boost converter 20 may comprise three or more inductive boost phases 24. In other embodiments, boost converter 20 may comprise fewer than three phases (e.g., a single phase or two phases).

In the boost active mode, control circuit 40 may deactivate (e.g., disable, open, turn off) bypass switch 30, and periodically commutate charge switches 34 (e.g., during a charging state of an inductive boost phase 24) and rectification switches 36 (e.g., during a transfer state of an inductive boost phase 24) of inductive boost phase 24 (as described in greater detail below) by generating appropriate control signals $P_1$, $\overline{P_1}$, $P_2$, $\overline{P_2}$, $P_3$, and $\overline{P_3}$, to deliver a current $I_{BAT}$ and boost battery voltage $V_{BAT}$ to a higher supply voltage $V_{SUPPLY}$ in order to provide a programmed (or servoed) desired current (e.g., average current) to the electrical node of supply voltage $V_{SUPPLY}$, while maintaining supply voltage $V_{SUPPLY}$ above threshold minimum voltage $V_{MIN}$. For example, control circuit 40 may operate in the boost active mode to maintain an inductor current $I_L$ (e.g., $I_{L1}$, $I_{L2}$, $I_{L3}$) between a peak current and a valley current as described in U.S. patent application Ser. No. 17/119,517 filed Dec. 11, 2020, and incorporated by reference herein in its entirety. In the boost active mode, control circuit 40 may operate boost converter 20 by operating inductive boost phase 24 in a peak and valley detect operation, as described in greater detail below. The resulting switching frequency of charge switches 34 and rectification switches 36 of inductive boost phase 24 may be determined by the sense voltage VDD_SENSE, supply voltage $V_{SUPPLY}$, an inductance of power inductor 32A, and a programmed ripple parameter (e.g., a configuration of a target current ripple for an inductor current $I_L$).

Figure 4:
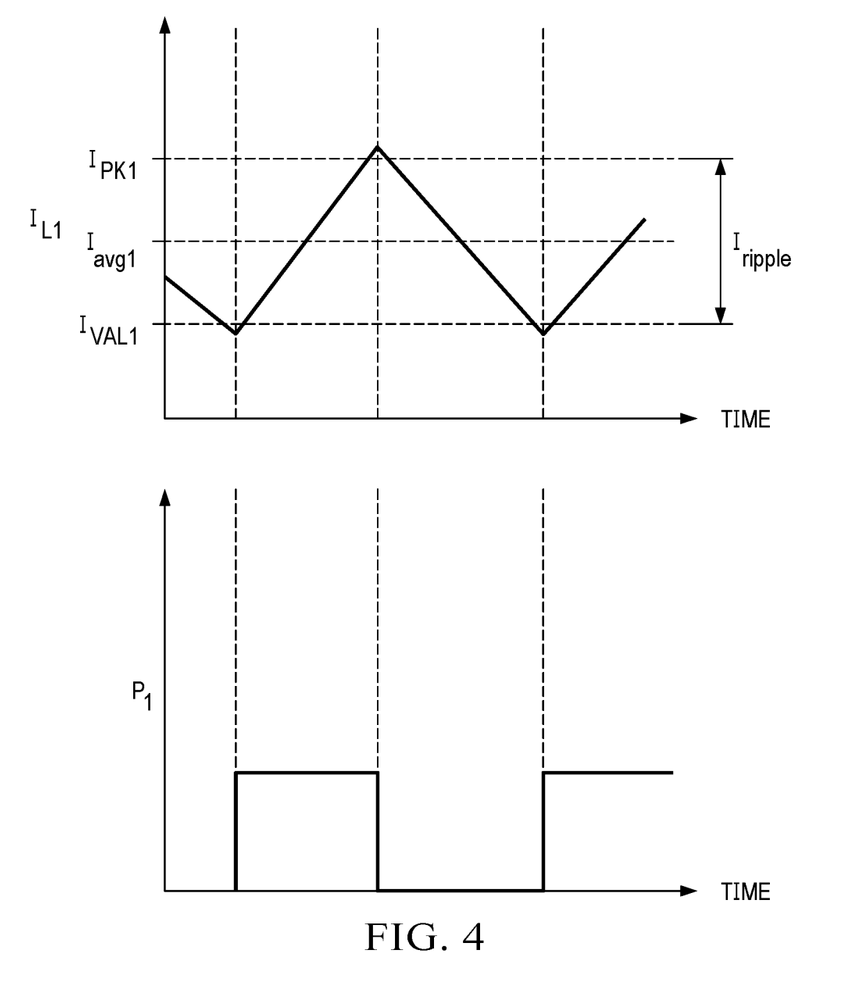
FIG. 4 illustrates a graph of inductor current through a phase of a boost converter and a control signal of switches of the phase versus time, in accordance with embodiments of the present disclosure.

When boost converter 20 operates in the boost active mode, control circuit 40 may provide hysteretic current control of inductor currents $I_{L1}$, $I_{L2}$, and $I_{L3}$ through power inductors 32A, 32B, and 32C, respectively. FIG. 4 illustrates an example graph of inductor current $I_{L1}$ and control signal $P_1$ versus time, in accordance with embodiments of the present disclosure. As shown in FIG. 4, control circuit 40 may generate control signals $P_1$ and $\overline{P_1}$ of inductive boost phase 24A such that: (a) when inductor current $I_{L1}$ falls below a valley current threshold $I_{val1}$, control circuit 40 may activate charge switch 34A and deactivate rectification switch 36A; and (b) when inductor current $I_{L1}$ increases above a peak current threshold $I_{pk1}$, control circuit 40 may deactivate charge switch 34A and activate rectification switch 36A. Accordingly, control circuit 40 may provide hysteretic control of inductor current $I_{L1}$ such that inductor current $I_{L1}$ varies between approximately valley current threshold $I_{val}$ and approximately peak current threshold $I_{pk1}$, with inductor current $I_{L1}$ having an average current $I_{avg1}$ and a ripple current $I_{ripple}$, such that:

$$I_{pk1} = I_{avg1} + \frac{I_{ripple}}{2}; \text{ and}$$

$$I_{val1} = I_{avg1} - \frac{I_{ripple}}{2}.$$

Control circuit 40 may also generate control signals $P_2$, $\overline{P_2}$, $P_3$, and $\overline{P_3}$ of inductive boost phases 24B and 24C to provide similar or identical control of inductor currents $I_{L2}$ and $I_{L3}$.

Figure 5A:
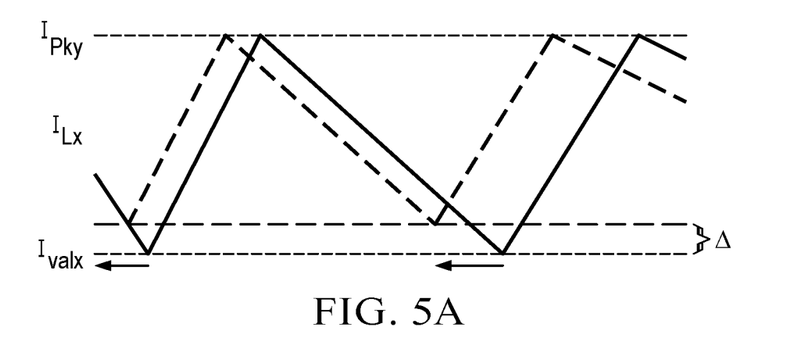
FIG. 5A illustrates a graph of inductor current through a phase of a boost converter in response to an increase of a threshold valley current, in accordance with embodiments of the present disclosure.

To minimize ripple, control circuit 40 may also stagger control signals $P_1$, $\overline{P_1}$, $P_2$, $\overline{P_2}$, $P_3$, and $\overline{P_3}$ in order to maximize misalignment of switching among inductive boost phases 24. To illustrate such functionality, control circuit 40 may be configured to dynamically vary peak current thresholds $I_{pkx}$ and/or valley current thresholds $I_{valx}$ for the various inductive boost phases 24 as described in greater detail below. For example, as shown in FIG. 5A, by increasing a valley current threshold $I_{valx}$ for an inductive boost phase 24 by an amount $\Delta$, control circuit 40 may reduce a period of inductor current $I_{Lx}$ for such inductive boost phase 24 from that shown in the solid-line waveform to that shown in the dashed-line waveform. As another example, as shown in FIG. 5B, by decreasing a valley current threshold $I_{valx}$ for an inductive boost phase 24 by an amount $\Delta$, control circuit 40 may increase a period of inductor current $I_{Lx}$ for such inductive boost phase 24 from that shown in the solid-line waveform to that shown in the dashed-line waveform.

Figure 5B:
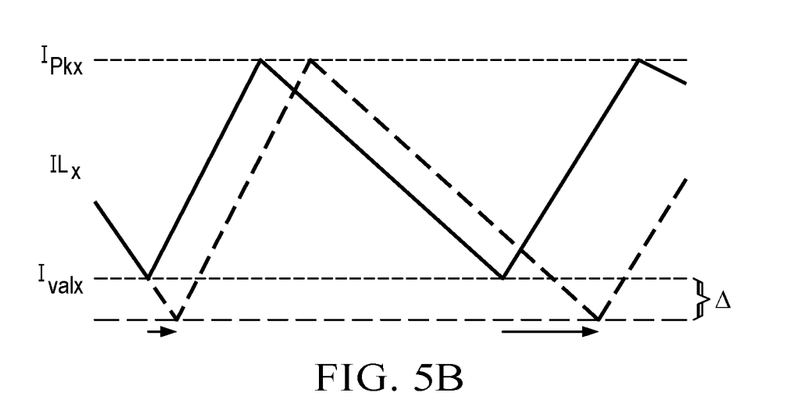
FIG. 5B illustrates a graph of inductor current through a phase of a boost converter in response to a decrease of a threshold valley current, in accordance with embodiments of the present disclosure.

For the purposes of ease of clarity and exposition, FIGS. 5A and 5B only contemplate varying of a valley current threshold $I_{valx}$ in order to vary a period of inductor current $I_{Lx}$ for an inductive boost phase 24. However, it is understood that an analogous approach could be used to vary a period of inductor current $I_{Lx}$ for an inductive boost phase 24 by varying a peak current threshold $I_{pkx}$, for example reducing a period of inductor current $I_{Lx}$ for an inductive boost phase 24 by decreasing peak current threshold $I_{pkx}$ and/or increasing a period of inductor current $I_{Lx}$ for an inductive boost phase 24 by increasing peak current threshold $I_{pkx}$. Thus, control circuit 40 may vary a period of inductor current $I_{Lx}$ for an inductive boost phase 24 by varying its peak current threshold $I_{pkx}$, varying its valley current threshold $I_{valx}$, or both.

Figure 6A:
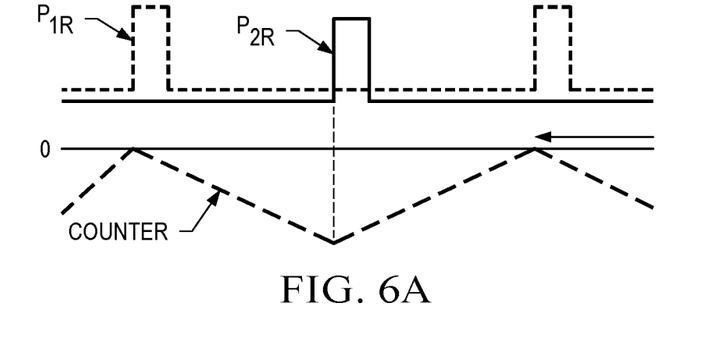
FIG. 6A illustrates a graph of waveforms indicating rising edges of control signals for controlling switching in a two-phase boost converter and a counter value of a counter that responds to such rising edges for when the two phases are perfectly misaligned, in accordance with embodiments of the present disclosure.
Figure 6B:
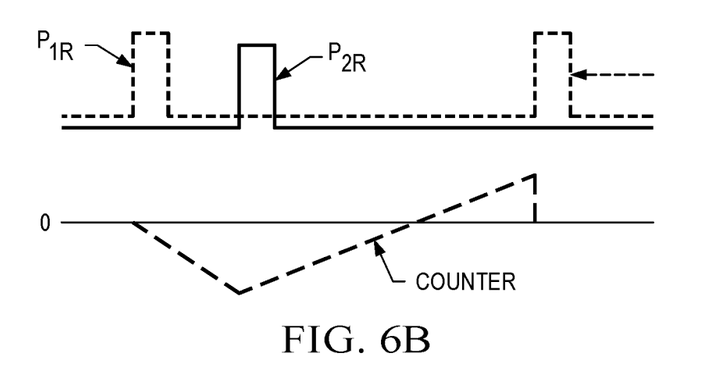
FIG. 6B illustrates a graph of waveforms indicating rising edges of control signals for controlling switching in a two-phase boost converter and a counter value of a counter that responds to such rising edges for when a first phase occurs too late relative to a second phase for perfect misalignment of the two phases, in accordance with embodiments of the present disclosure.
Figure 6C:
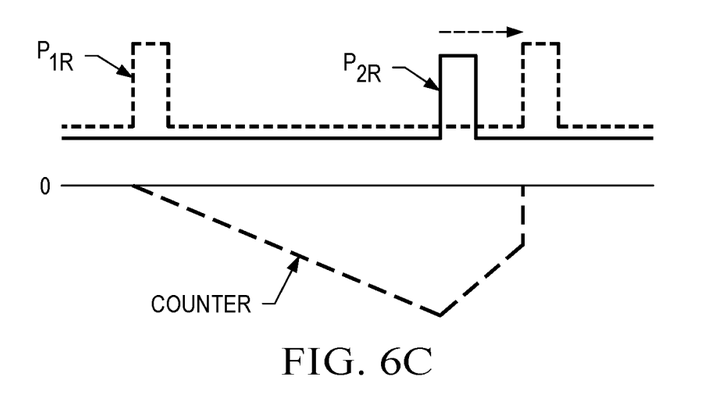
FIG. 6C illustrates a graph of waveforms indicating rising edges of control signals for controlling switching in a two-phase boost converter and a counter value of a counter that responds to such rising edges for when a first phase occurs too early relative to a second phase for perfect misalignment of the two phases, in accordance with embodiments of the present disclosure.

To determine whether to vary a peak current threshold $I_{pkx}$ and/or valley current threshold $I_{valx}$ for an inductive boost phase 24, control circuit 40 may determine the relative phase alignment between such inductive boost phase 24 and other phases of boost converter 20. To do so, control circuit 40 may implement a counter that may be triggered by the rising edges of control signals $P_1$, $\overline{P_1}$, $P_2$, $\overline{P_2}$, $P_3$, and $\overline{P_3}$. For illustrative purposes, FIGS. 6A-6C depict this concept with respect to a boost converter 20 having only two inductive boost phases 24A and 24B. FIG. 6A illustrates example waveforms $P_{1rise}$ and $P_{2rise}$, which may each have a short pulse in response to rising edges of control signals $P_1$ and $P_2$, respectively, in accordance with embodiments of the present disclosure. FIG. 6A also illustrates an example counter variable that is responsive to example waveforms $P_{1rise}$ and $P_{2rise}$, such that control circuit 40 decrements such counter in response to a pulse of waveform $P_{1rise}$, and continues to decrement the counter until such time as a pulse of waveform $P_{2rise}$ occurs, then continues to increase the counter until such time as another pulse of waveform $P_{1rise}$ occurs, at which point the counter may be reset. If control signals $P_1$ and $P_2$ are perfectly misaligned over a switching period of power converter 20, then the counter value may equal zero upon occurrence of the second pulse of waveform $P_{1rise}$, as shown in FIG. 6A.

On the other hand, if control signals $P_1$ and $P_2$ are not perfectly misaligned due to control signal $P_1$ rising "late" relative to the rising edge of control signal $P_2$, the counter value may be positive upon occurrence of the second pulse of waveform $P_{1rise}$, as shown in FIG. 6B, which may serve as a trigger for control circuit 40 to "shift" control signal $P_1$ leftward, by decreasing peak current threshold $I_{pk1}$ and/or increasing valley current threshold $I_{val1}$ for inductive boost phase 24A. Similarly, if control signals $P_1$ and $P_2$ are not perfectly misaligned due to control signal $P_1$ rising "early" relative to the rising edge of control signal $P_2$, the counter value may be negative upon occurrence of the second pulse of waveform $P_{1rise}$, as shown in FIG. 6C, which may serve as a trigger for control circuit 40 to "shift" control signal $P_1$ rightward, by increasing peak current threshold $I_{pk1}$ and/or decreasing valley current threshold $I_{val1}$ for inductive boost phase 24A.

In this two-phase example, in addition to or in lieu of varying peak current threshold $I_{pk1}$ and/or valley current threshold $I_{val1}$ for inductive boost phase 24A based on the alignment of control signal $P_1$ relative to control signal $P_2$, control circuit 40 may also vary peak current threshold $I_{pk2}$ and/or valley current threshold $I_{val2}$ for inductive boost phase 24B based on the alignment of control signal $P_2$ relative to control signal $P_1$.

Figure 7:
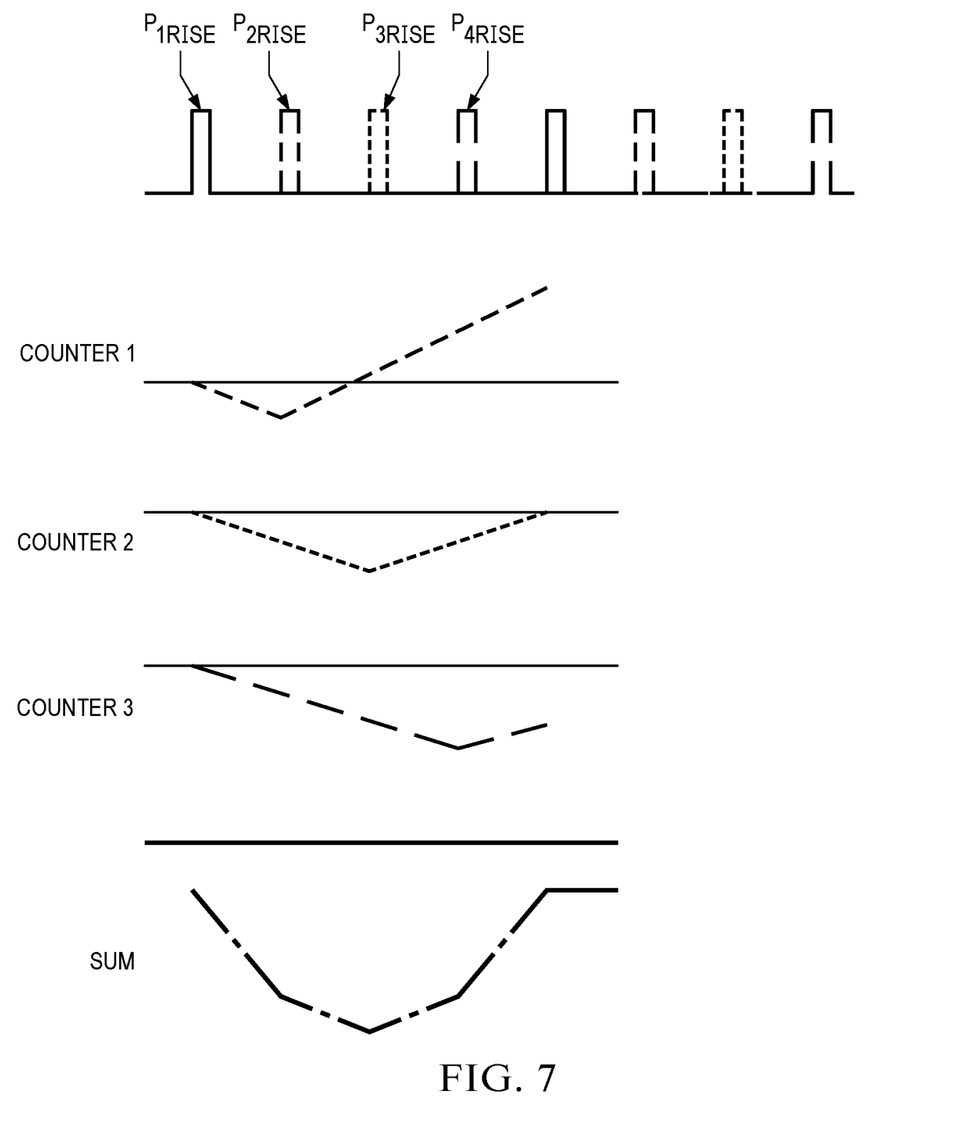
FIG. 7 illustrates a graph of waveforms indicating rising edges of control signals for controlling switching in a four-phase boost converter and counter values of counters that respond to such rising edges for when the four phases are perfectly misaligned, in accordance with embodiments of the present disclosure.

Extending the concept illustrated in FIGS. 5A-6C to a boost converter 20 with more than two inductive boost phases 24, FIG. 7 illustrates example waveforms $P_{1rise}$, $P_{2rise}$, $P_{3rise}$, and $P_{4rise}$, which may each have a short pulse in response to rising edges of control signals $P_1$, $P_2$, $P_3$, and $P_4$, respectively, of a four-phase boost converter 20, in accordance with embodiments of the present disclosure. FIG. 7 also illustrates example counter variables that are responsive to example waveforms $P_{1rise}$, $P_{2rise}$, $P_{3rise}$, and $P_{4rise}$. Control circuit 40 may decrement each of the three counters in response to a pulse of waveform $P_{1rise}$. Further, control circuit 40 may continue to decrement a first counter until such time as a pulse of waveform $P_{2rise}$ occurs then increment such first counter, decrement a second counter until such time as a pulse of waveform $P_{3rise}$ occurs then increment such second counter, and decrement a third counter until such time as a pulse of waveform $P_{4rise}$ occurs then increment such third counter. Once incrementing, each counter may increase until such time as another pulse of waveform $P_{1rise}$ occurs, at which point all of the counters may be reset. Control circuit 40 may then sum the values of the three counters at the second pulse of waveform $P_{1rise}$. Responsive to a counter sum of zero, control circuit 40 may leave peak current threshold $I_{pk1}$ and valley current threshold $I_{val1}$ unchanged. Responsive to a positive counter sum, control circuit 40 may decrease peak current threshold $I_{pk1}$ and/or increase valley current threshold $I_{val1}$. Responsive to a negative counter sum, control circuit 40 may increase peak current threshold $I_{pk1}$ and/or decrease valley current threshold $I_{val1}$.

The same algorithm applied to control signal $P_1$ may also be applied to all other phases in order to control their own respective peak and valley current thresholds. In other words, control circuit 40 may: (a) implement counters and sum counter values for control signal $P_1$ relative to control signals $P_2$, $P_3$, and $P_4$ and vary peak current threshold $I_{pk1}$ and/or valley current threshold $I_{val1}$ based on such sum; (b) implement counters and sum counter values for control signal $P_2$ relative to control signals $P_1$, $P_3$, and $P_4$ and vary peak current threshold $I_{pk2}$ and/or valley current threshold $I_{val2}$ based on such sum; (c) implement counters and sum counter values for control signal $P_3$ relative to control signals $P_1$, $P_2$, and $P_4$ and vary peak current threshold $I_{pk3}$ and/or valley current threshold $I_{val3}$ based on such sum; and (d) implement counters and sum counter values for control signal $P_4$ relative to control signals $P_1$, $P_2$, and $P_3$ and vary peak current threshold $I_{pk4}$ and/or valley current threshold $I_{val4}$ based on such sum.

The sum of the counter values is a piecewise linear curve, meaning that the resulting per-phase functionality described above with respect to FIG. 7 above may effectively be that of a piecewise linear ramp generator. Stated another way, rather than implement a series of counters for each phase to generate the waveform for the summation of the counters shown in FIG. 7, a similar waveform may be generated using a piecewise linear ramp generator.

Figure 8:
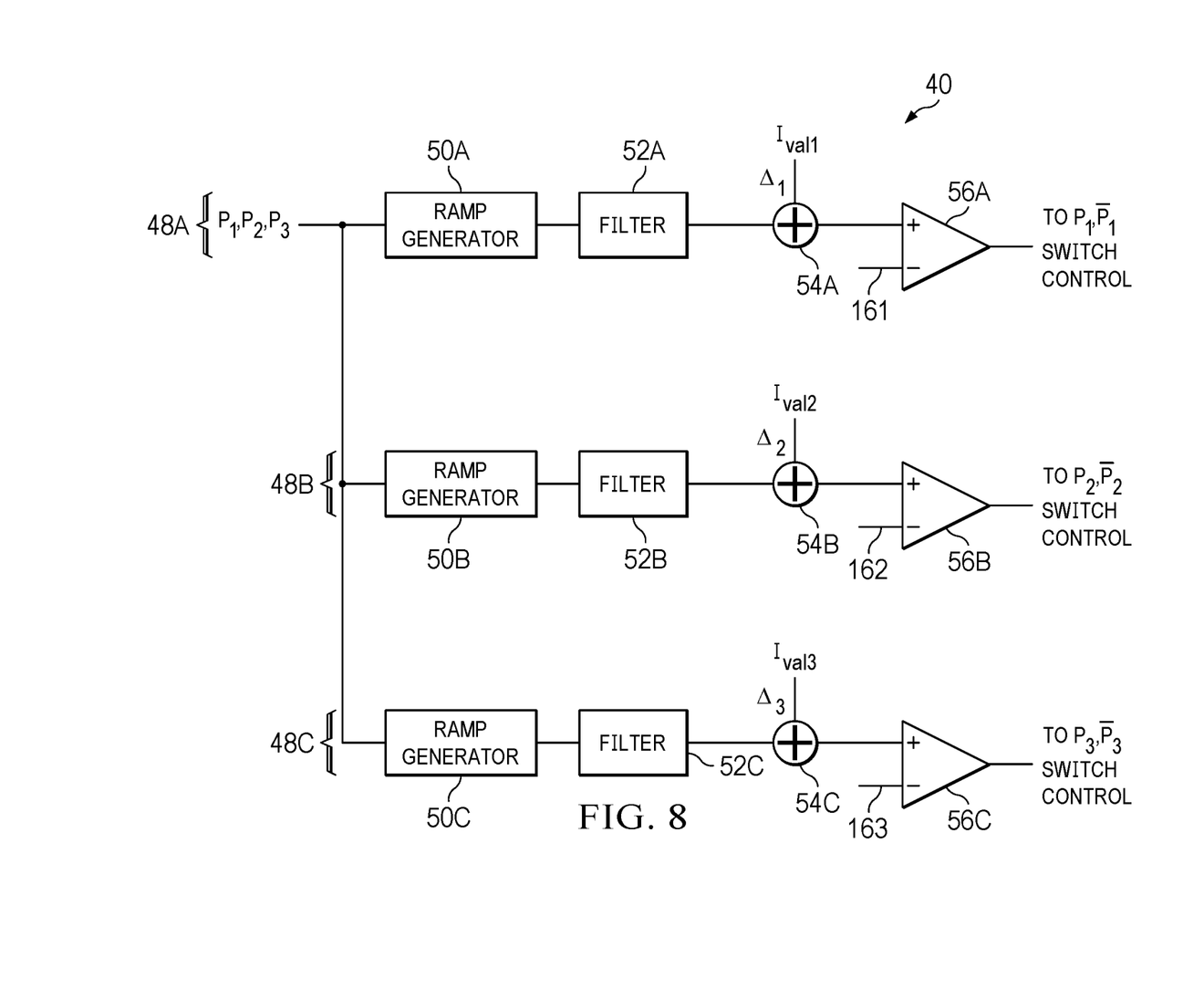
FIG. 8 depicts a block diagram of an example architecture of selected components of a control circuit for controlling switching of the power converter depicted in FIG. 3, including piecewise linear ramp generators for each phase of the power converter, in accordance with embodiments of the present disclosure.

FIG. 8 depicts a block diagram of an example architecture of selected components of control circuit 40, including piecewise linear ramp generators 50 (e.g., piecewise linear ramp generators 50A, 50B, 50C) for each inductive boost phase 24, in accordance with embodiments of the present disclosure. For purposes of clarity and exposition, the example architecture shown in FIG. 8 is that of a boost converter 20 having three inductive boost phases 24A, 24B, and 24C. However, it is understood that architectures similar to that shown in FIG. 8 may be applied to a boost converter 20 having any number of inductive boost phases 24.

As shown in FIG. 8, control circuit 40 may comprise a control path 48A associated with inductive boost phase 24A, a control path 48B associated with inductive boost phase 24B, and a control path 48C associated with inductive boost phase 24C. Each control path 48 may comprise a ramp generator 50 (e.g., ramp generators 50A, 50B, and 50C), a filter 52 (e.g., filters 52A, 52B, and 52C), a summer 54 (e.g., summers 54A, 54B, and 54C), and a comparator 56 (e.g., comparators 56A, 56B, and 56C). A ramp generator 50 may comprise any suitable system, device, or apparatus configured to output a value indicative of a relative alignment of an inductive boost phase 24 with respect to other inductive boost phases 24, with a value of zero indicating perfect alignment, a positive value indicating that the inductive boost phase 24 is early with respect to the other inductive boost phases, and a negative value indicating that the inductive boost phase 24 is late with respect to the other inductive boost phases. A filter 52 may smooth, filter, and/or quantize the value output by ramp generator 50 in order to generate a delta value $\Delta$ (e.g., $\Delta_1$, $\Delta_2$, $\Delta_3$).

A summer 54 may add such delta value to a threshold valley current $I_{valx}$ (or subtract from threshold peak current $I_{pkx}$) to generate a modified threshold valley current (or modified threshold peak current) for comparison by comparator 56 with an inductor current $I_{Lx}$. The output signal of comparators 56 may then be used for control of control signals $P_1$, $\overline{P_1}$, $P_2$, $\overline{P_2}$, $P_3$, and $\overline{P_3}$ (e.g., current $I_{L1}$ decreasing below the sum $I_{val1}+\Delta_1$ may cause control circuit to activate control signal $P_1$ and deactivate $\overline{P_1}$).

Figure 9:
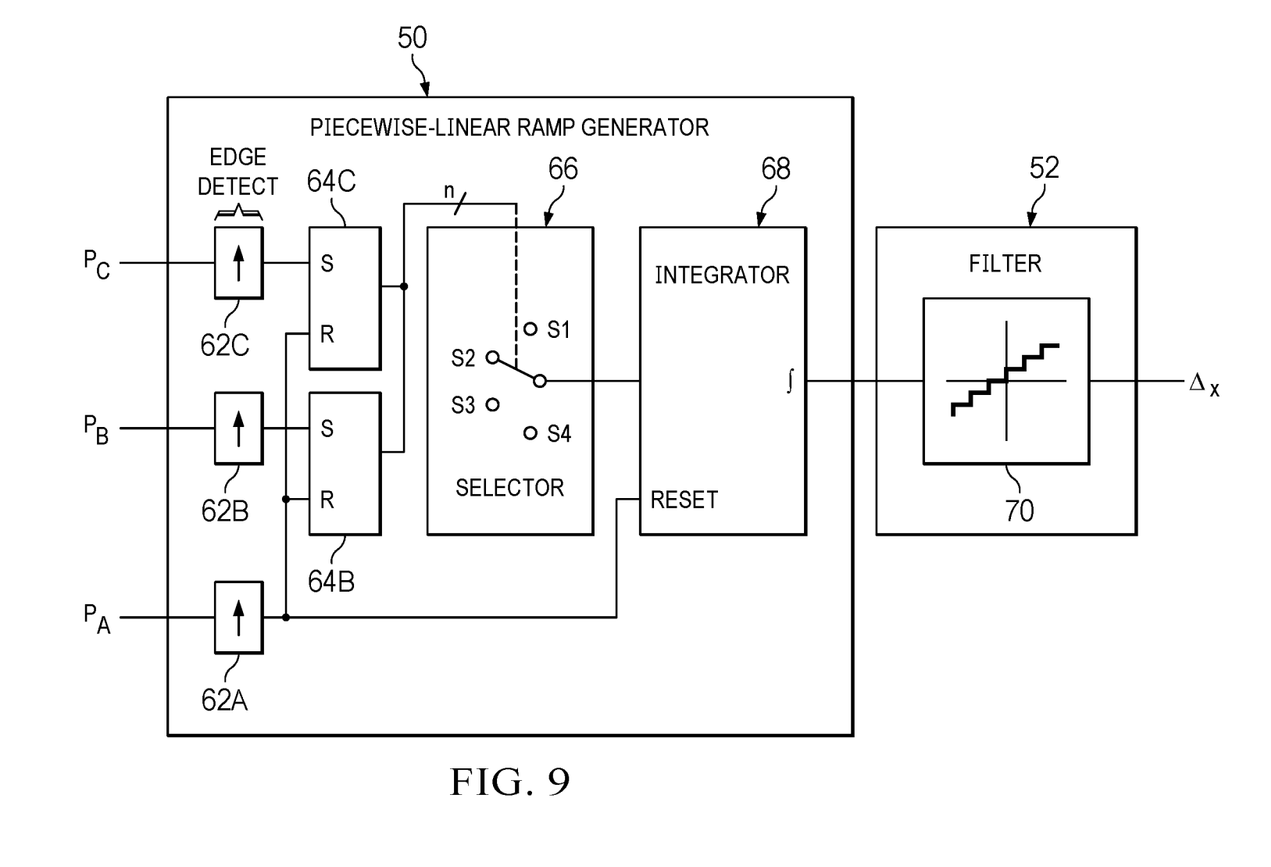
FIG. 9 depicts a block diagram of an example architecture of a piecewise linear ramp generator and example details of a filter, in accordance with embodiments of the present disclosure.

FIG. 9 depicts a block diagram of an example architecture of a piecewise linear ramp generator 50 and example details of a filter 52, in accordance with embodiments of the present disclosure. As shown in FIG. 9, edge detectors 62 (e.g., edge detectors 62A, 62B, and 62C) may detect rising edges of a primary control signal $P_A$ and secondary controls signals $P_B$ and $P_C$ for the inductive boost phase 24 associated with the path 48 that includes the piecewise linear ramp generator 50. For example, with respect to inductive boost phase 24A, its primary control $P_A$ may be control signal $P_1$ and its secondary control signals $P_B$ and $P_C$ may be control signals $P_2$ and $P_3$. Likewise, with respect to inductive boost phase 24B, its primary control $P_A$ may be control signal $P_2$ and its secondary control signals $P_B$ and $P_C$ may be control signals $P_1$ and $P_3$. Further, with respect to inductive boost phase 24C, its primary control $P_A$ may be control signal $P_3$ and its secondary control signals $P_B$ and $P_C$ may be control signals $P_1$ and $P_2$.

Piecewise linear ramp generator 50 may also include a set-reset (SR) latch 64 (e.g., SR latches 64B and 64C) for each secondary control signal. An SR latch 64 may set its output to "1" on each rising edge of its respective secondary control signal (e.g., $P_B$ or $P_C$) and reset its output to "0" on each rising edge of primary control signal $P_A$. The resulting outputs of SR latches 64 may be used to select a value to be output by a selector 66. For example, the value output by selector 66 may comprise a difference A–B, wherein A is a number of SR latches 64 having an output of 1 and B is a number of SR latches 64 having an output of 0. Thus, selector 66 essentially selects a slope for the piecewise linear curve output by piecewise linear ramp generator 50.

An integrator 68 may accumulate samples of the values output by selector 66 and integrator 68 may be reset at each rising edge of primary control signal $P_A$. Accordingly, the value output by integrator 68 immediately before being reset by a rising edge of primary control signal $P_A$ may be indicative of a degree to which the inductive boost phase 24 associated with the primary control signal $P_A$ deviates from perfect misalignment relative to other inductive boost phases 24 of boost converter 20.

As shown in FIG. 9, filter 52 may be implemented at least in part with a single-bit quantizer 70.

Figure 10:
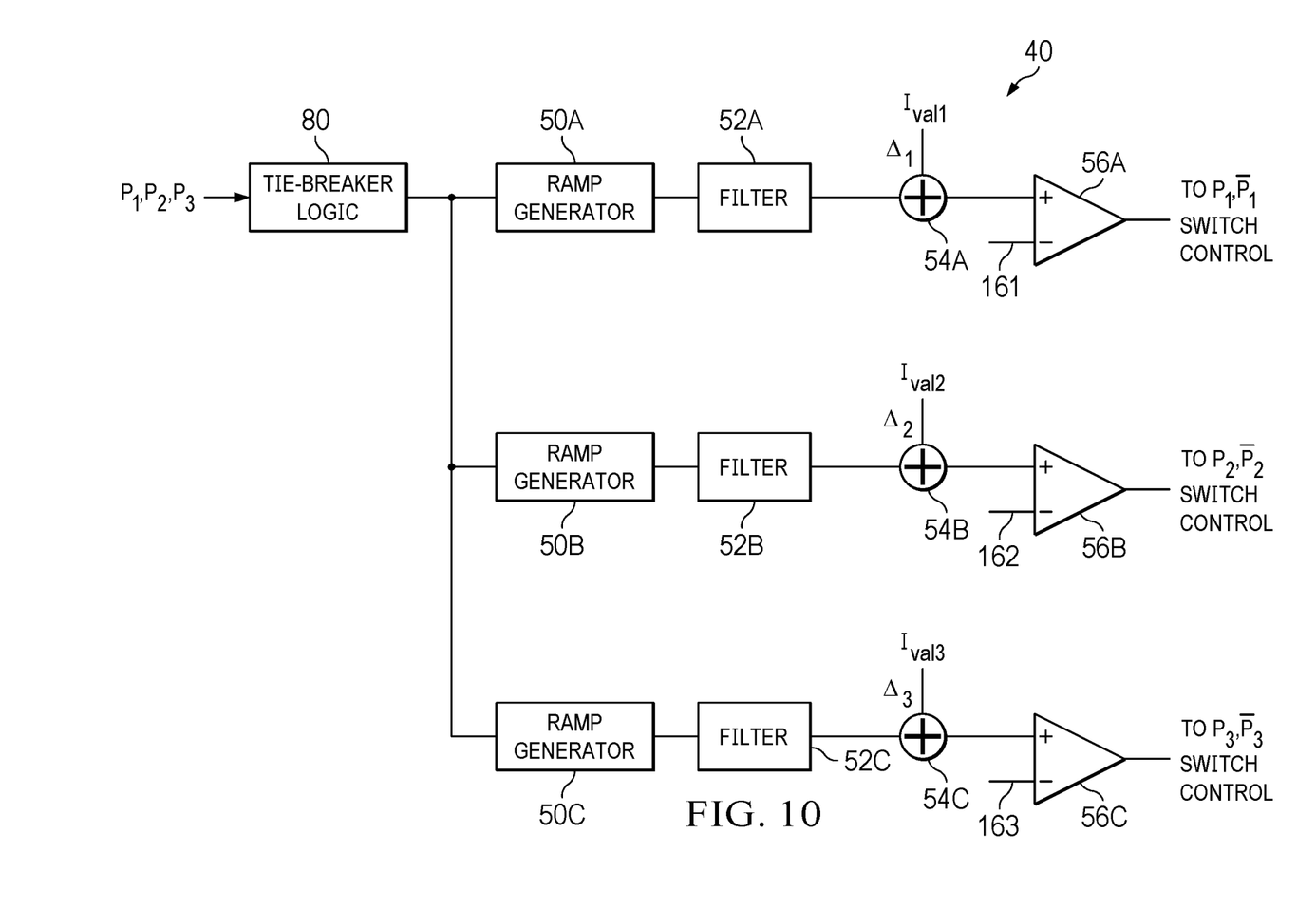
FIG. 10 illustrates the block diagram of the example architecture of selected components of the control circuit depicted in FIG. 8 further including tie-breaker logic, in accordance with embodiments of the present disclosure.

FIG. 10 illustrates the block diagram of the example architecture of selected components of control circuit 40 depicted in FIG. 8, but including tie-breaker logic 80, in accordance with embodiments of the present disclosure. To illustrate, in the event two inductive boost phases 24 become perfectly aligned using the systems and methods shown and described with respect to FIG. 8, control paths 48 for both inductive boost phases 24 may calculate the same delta value Δ, use the same modified threshold peak and/or valley current, and thus, may never drift apart unless some mechanism is applied to break the tie between them. Accordingly, in such a scenario, when tie-breaker logic 80 detects that two control signals (e.g., two of control signals $P_1$, $P_2$, and $P_3$) are aligned, it may blank (e.g., set constant at zero) one of the control signals for a period of time prior to such control signal being received by ramp generators 50. The control signal being blanked may be selected in any manner, including randomly or by a ranking of control signals $P_1$, $P_2$, and $P_3$ such that the highest or lowest ranked control signal is blanked.

Although the foregoing discussion contemplates systems and methods for minimizing current ripple by maximizing phase misalignment among inductive boost phases 24 of a boost converter 20, it is understood that systems and methods similar or identical to those set forth above may be applied to other types of power converters, including without limitation buck converters, buck-boost converters, etc.

Although the foregoing discussion contemplates systems and methods for minimizing current ripple by maximizing phase misalignment among inductive boost phases 24 of a peak/valley current controlled boost converter 20, it is understood that systems and methods similar or identical to those set forth above may be applied to other types of control architectures for power converters having non-fixed frequency-based switch control. "Non-fixed frequency-based switch control" as used herein means any control architecture for a power converter that does not rely on fixed-frequency switching of switches of the power converter, and instead relies on other mechanisms for controlling frequency switching of switches of the power converter, including peak/valley current control, fixed on-time control, and other suitable control mechanisms.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system for generating a plurality of switch control signals of a multiphase power converter, the system comprising:
   a plurality of inputs, each input of the plurality of inputs configured to receive a respective control signal for controlling a respective phase of the multiphase power converter; and
   a plurality of control paths comprising a control path for each respective control signal, each control path configured to, for its respective control signal, control a switching period of the respective control signal for such control path based on a measure of alignment among the respective control signal for such control path and the other respective control signals of the other control paths;
   wherein each control path comprises a respective piecewise linear ramp generator configured to control the switching period of the respective control signal for such control path by generating an offset based on the measure of alignment among the respective control signal for such control path and the other respective control signals of the other control paths, wherein such offset is applied to control parameters for generating the respective control signal such that the switching period of the respective control signal is a function of such offset.

2. The system of claim 1, wherein each phase of the multiphase power converter is peak/valley current controlled, and the offset is applied to one or both of a threshold peak current and a threshold valley current associated with such phase.

3. The system of claim 1, wherein each control path further comprises a respective filter configured to filter the offset generated by the respective piecewise linear ramp generator for such control path to generate a filtered offset that is applied to control parameters for generating the respective control signal such that the switching period of the respective control signal is a function of such filtered offset.

4. The system of claim 3, wherein the filter comprises a quantizer.

5. The system of claim 1, wherein each piecewise linear ramp generator comprises:
   a primary edge detector configured to receive the respective control signal for the control path that includes such piecewise linear ramp generator and generate a primary edge signal;
   one or more secondary edge detectors, each secondary edge detector configured to receive a respective control signal for a second control path other than the control path that includes such piecewise linear ramp generator and generate a respective secondary edge signal;
   a slope selector configured to generate a slope based on a measure of alignment among the primary edge signal and the one or more secondary edge signals; and
   an integrator configured to integrate the slope over time to generate the offset associated with the control path that includes such piecewise linear ramp generator.

6. The system of claim 1, further comprising tie-breaker logic interfaced between the plurality of inputs and the plurality of control paths and configured to eliminate simultaneous edge transitions between two or more of the respective control signals.

7. A method for generating a plurality of switch control signals of a multiphase power converter, the method comprising:
   receiving at each of a plurality of inputs a respective control signal for controlling a respective phase of the multiphase power converter; and
   for a plurality of control paths comprising a control path for each respective control signal, controlling by each control path, for its respective control signal, a switching period of the respective control signal for such control path based on a measure of alignment among the respective control signal for such control path and the other respective control signals of the other control paths;
   wherein each control path comprises a respective piecewise linear ramp generator configured to control the switching period of the respective control signal for such control path, and the method further comprises:
      generating, by each respective piecewise linear ramp generator, an offset based on the measure of alignment among the respective control signal for such control path and the other respective control signals of the other control paths; and
      applying such offset to control parameters for generating the respective control signal such that the switching period of the respective control signal is a function of such offset.

8. The method of claim 7, wherein each phase of the multiphase power converter is peak/valley current controlled, and the offset is applied to one or both of a threshold peak current and a threshold valley current associated with such phase.

9. The method of claim 7, each control path further comprising a respective filter configured to filter the offset generated by the respective piecewise linear ramp generator for such control path to generate a filtered offset, and the method further comprising applying the filtered offset to control parameters for generating the respective control signal such that the switching period of the respective control signal is a function of such filtered offset.

10. The method of claim 9, wherein the filter comprises a quantizer.

11. The method of claim 7, further comprising within each piecewise linear ramp generator:
   receiving, by a primary edge detector of such piecewise linear ramp generator, the respective control signal for the control path that includes such piecewise linear ramp generator and generate a primary edge signal;
   receiving, by one or more secondary edge detectors of such piecewise linear ramp generator, a respective control signal for a second control path other than the control path that includes such piecewise linear ramp generator and generate a respective secondary edge signal;
   generating, by a slope selector of such piecewise linear ramp generator, a slope based on a measure of alignment among the primary edge signal and the one or more secondary edge signals; and
   integrating, by an integrator of such piecewise linear ramp generator, the slope over time to generate the offset associated with the control path that includes such piecewise linear ramp generator.

12. The method of claim 7, further comprising eliminating, with tie-breaker logic interfaced between the plurality of inputs and the plurality of control paths, simultaneous edge transitions between two or more of the respective control signals.

13. A system for generating a plurality of switch control signals of a multiphase power converter, the system comprising:
   a plurality of inputs, each input of the plurality of inputs configured to receive a respective control signal for controlling a respective phase of the multiphase power converter;
   a plurality of control paths comprising a control path for each respective control signal, each control path configured to, for its respective control signal, control a switching period of the respective control signal for such control path based on a measure of alignment among the respective control signal for such control path and the other respective control signals of the other control paths; and
   tie-breaker logic interfaced between the plurality of inputs and the plurality of control paths and configured to eliminate simultaneous edge transitions between two or more of the respective control signals.

14. A method for generating a plurality of switch control signals of a multiphase power converter, the method comprising:

receiving at each of a plurality of inputs a respective control signal for controlling a respective phase of the multiphase power converter;
for a plurality of control paths comprising a control path for each respective control signal, controlling by each control path, for its respective control signal, a switching period of the respective control signal for such control path based on a measure of alignment among the respective control signal for such control path and the other respective control signals of the other control paths; and
eliminating, with tie-breaker logic interfaced between the plurality of inputs and the plurality of control paths, simultaneous edge transitions between two or more of the respective control signals.

* * * * *